Aug. 7, 1928.

S. M. HOYE 1,679,525

MEANS FOR TREATING HOLLY AND LIKE PLANTS AND PRODUCTS DERIVED THEREFROM

Filed Dec. 15, 1922  2 Sheets-Sheet 1

Fig.1,

WITNESSES

INVENTOR
Stephen M. Hoye
BY
ATTORNEYS

Aug. 7, 1928.

S. M. HOYE 1,679,525

MEANS FOR TREATING HOLLY AND LIKE PLANTS AND PRODUCTS DERIVED THEREFROM

Filed Dec. 15, 1922 2 Sheets-Sheet 2

INVENTOR
Stephen M. Hoye
BY
ATTORNEYS

Patented Aug. 7, 1928.

1,679,525

UNITED STATES PATENT OFFICE.

STEPHEN M. HOYE, OF BROOKLYN, NEW YORK.

MEANS FOR TREATING HOLLY AND LIKE PLANTS AND PRODUCTS DERIVED THEREFROM.

Application filed December 15, 1922. Serial No. 607,153.

My invention relates to a method and means whereby I am enabled to produce products and by-products from the holly leaves, either the thorned leaves common in the southern part of the United States or from the comparatively thornless holly leaves, known as mate, common in several of the countries of South America.

The general object of my invention is to so treat holly leaves as to produce extracts available as a beverage or in concentrated form as a confection or a medicine having laxative properties and to moreover produce from the leaves a by-product having very superior value as an animal food for cattle, etc., and as a food for chickens.

The nature of my invention and its distinguishing features will clearly appear as the description proceeds.

Reference is to be had to the accompanying drawings forming a part of this specification, it being understood that the drawings are merely illustrative of one example of the invention.

Figure 1 is a partly sectional side elevation of a plant comprising apparatus for treating the holly leaves in accordance with my invention, the individual features of said plant to be hereinafter particularly referred to;

Figure 1:
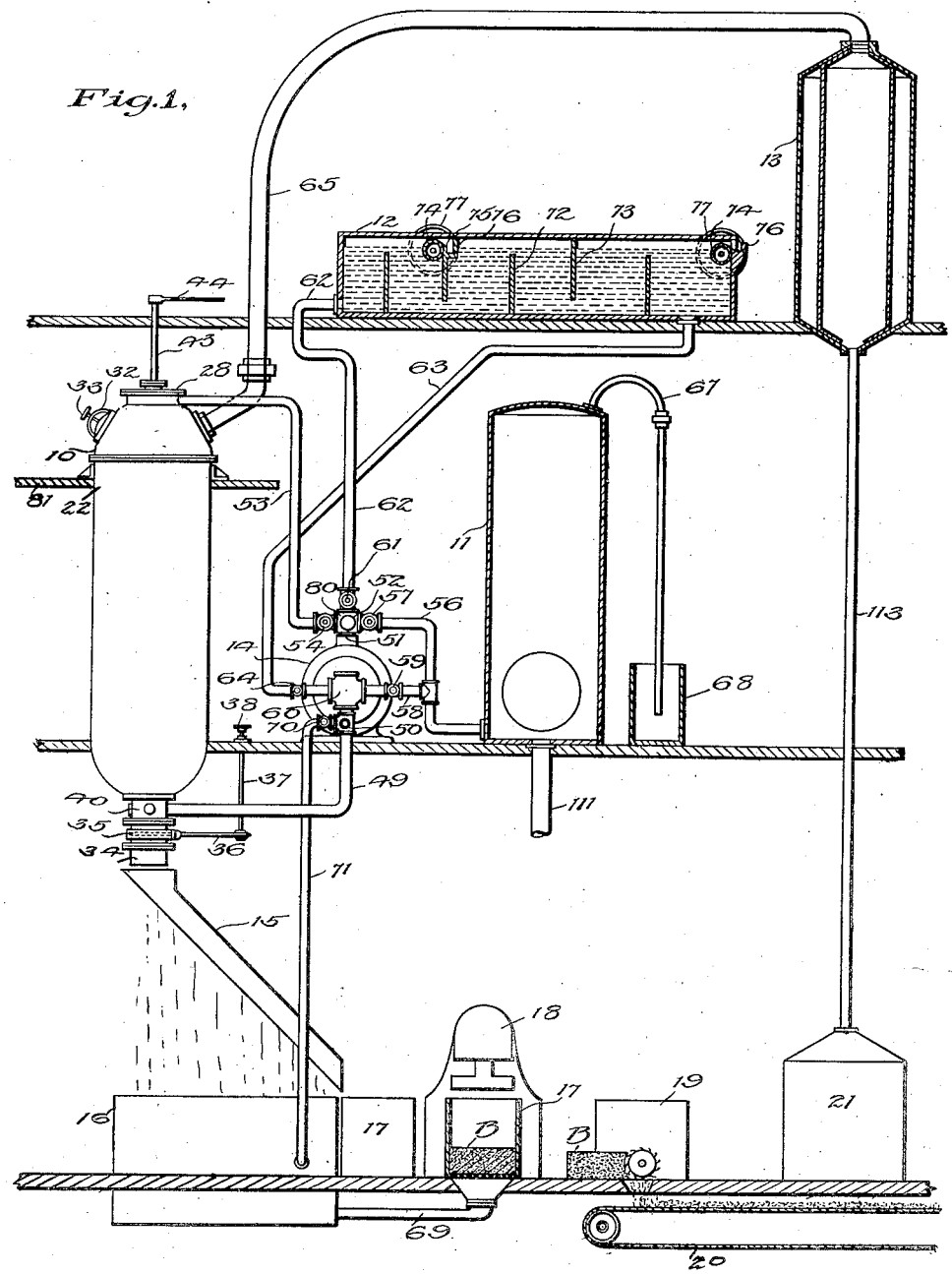
Figure 2:
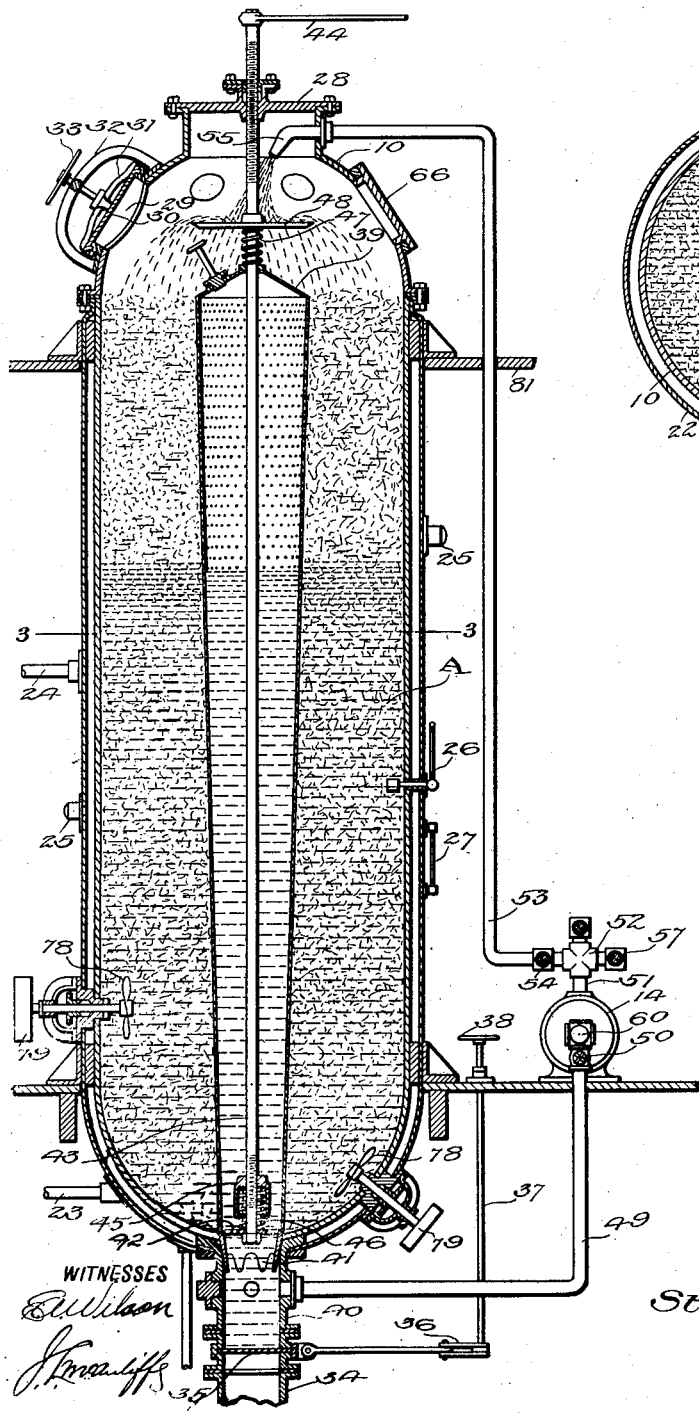
Figure 2 is an enlarged vertical section of a percolator and concentrator constructed in accordance with my invention.
Figure 3:
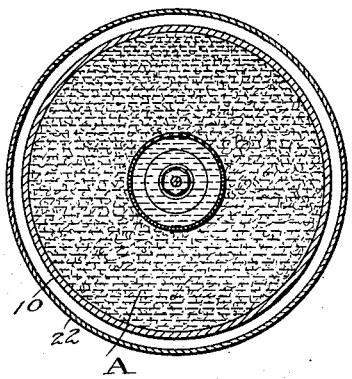
Figure 3 is a horizontal section on the line 3—3, Figure 2.

In carrying out my invention in accordance with the illustrated example a percolator 10 is provided, which also is used as a concentrator as hereinafter explained. The numeral 11 designates a fermentation tank to be hereinafter particularly referred to; and 12 a clarifier; the numeral 13 indicates a condenser connected with the percolator 10 when the latter is used as a concentrator, and 14, designates a pump through the medium of which the percolator, fermentation tank 11, and clarifier 12 are connected up. The numeral 15 indicates a chute to which the material is discharged from the percolator 10 at the bottom, said chute having a screen through which fluid may escape to a tank or receptacle 16 while the solid matter is directed to a portable box 17 adapted to be moved beneath a press 18. The numeral 19 indicates a shredded shown conventionally and which may have any improved construction for shredding the material, the shredded material passing to a conveyor belt 20 or otherwise suitably disposed of. The numeral 21 indicates the drip receiver for the condenser 13.

The percolator is provided with a steam jacket 22, having a steam inlet pipe 23 and an outlet pipe 24 leading to any suitable source of steam supply, not shown. The steam jacket is provided also with a safety valve or valves 25 conventionally indicated. A thermometer 26 of any approved construction is provided on the percolator outside of the steam jacket and extending into the interior of the percolator. The numeral 27 indicates a pressure gage on the steam jacket. The percolator 10 has a suitable cap 28 and near the top at a side of the percolator is an opening 29 or manhole for charging the percolator with the holly leaves A, said opening 29 having a suitable closure for instance a cap 30 to the spider 31 of which a clamp is swivelled, the shank of the clamp extending through a frame 32 on the percolator and having a handwheel 33 or the like.

From the bottom of the tank leads an outlet 40 to which a discharge pipe 34 is suitably connected, there being interposed a gate valve 35 having link connections 36 with a vertical valve rod 37 provided with a handwheel 38 or the like adjacent the pump 14. Within the percolator 10 is a vertical tubular strainer 39 disposed at the center of the percolator. The lower end of the tubular strainer 39 has secured thereto a tubular fitting 41 tapered to enter the discharge fitting 40 and corrugated to prevent clogging. The top 42 of fitting 41 has the form of a spider through which a vertical rod 43 extends, said rod disposed axially in the strainer 39. A cap nut 45 is threaded onto the rod 43 above the spider 42 and a spring 46 is coiled about the rod beneath the cap 45 and bearing at its lower end against the spider 42. The upper end of the rod 43 has threaded engagement with the percolator cap 28 and is provided with a suitable handle 44 for turning. Thus, the rod 43 may be turned by reason of the threaded engagement with cap 28 and screwed down so that the bottom fitting 41 is held snugly in the discharge outlet 40, whereby the strainer 39 is centered and braced in position. The purpose of the spring 46 and nut 45 is to tightly hold the bottom fitting 41 in position while leaving the rod 43 free for axial movement relatively to spider 42 following the expansion or contraction of said rod 43. The rod 43 above the top of the tubular strainer 39 has a spring 47 coiled about the same, the upper end of the spring bearing against a spreader plate 48, for spreading the fluid as received in the percolator by a pipe 53 hereinafter referred to. The pipe 49 taps the outlet 40 at the side, above the gate valve 35, said pipe having a shut-off valve 50 and leading to a four-way inlet 60 of pump 14. 51 indicates a discharge pipe from the pump 14, said discharge pipe having a four-way fitting 52 through one branch of which leads a pipe 53 which is provided with a shut-off valve 54, said pipe 53 entering the percolator 10 at the top and provided with a nozzle 55 positioned at an angle to discharge onto the spreader disk 48.

From a second branch of the four-way discharge fitting 52 leads a pipe 56 to the bottom of the fermentation tank 11, said pipe 56 having a shut-off valve 57.

The pipe 56 has connection with a pipe 58 provided with a shut-off valve 59 and connecting the pipe 56 with the pump inlet 60, so that the liquid may be drawn by the pump from the fermentation tank 11 when valve 57 is closed and valve 59 open. A branch of the four-way fitting 52 connects by a pipe 62 having a shut-off valve 61 and leading to the clarifier 12. From the bottom of the clarifier 12 at the end opposite the inlet pipe 62 leads an outlet pipe 63 provided with a shut-off valve 64 and connected with a branch of the four-way pump inlet 60.

When the percolator 10 is used as a concentrator a pipe 65 is connected with a condenser 13 and with the percolator 10 at the top, there being an opening for the purpose closed by a cap 66 when the percolator is functioning as such and not as a concentrator. The numeral 113 indicates the drip pipe from the condenser 13 to the receiver 21.

In practice the holly leaves are placed in the vessel 10 and the same is employed as a percolator with a suitable quantity of water. Valves 50 and 54 are opened and the valves 57, 59 and 61 are closed. The steam jacket serves to heat the vessel 10 to a high degree. The pump having been started there will be a circulation from the vessel 10 through outlet 40, pipe 49, pump 14, discharge 51, fitting 52, valve 54 and pipe 53 to the nozzle 55.

The circulation of the liquid in the vessel 10 and the subjection of the leaves therein to the heat from the steam jacket is continued until an extract or infusion is obtained of the desired strength. The gate valve 35 is now opened and the liquid drained from the material is discharged to the tank 16. The leaves are discharged through the pipe 34 to chute 15 and into a box 17 of which a number are employed in practice. The box 17 filled with the leaves is removed to the press 18 and the liquid squeezed from the leaves and the latter formed into a solid mass or cake. The liquid from the box 17 in the press may be collected in any suitable manner, there being shown a pipe 69 running from the bottom of the press to the tank 16, it being understood that the bottom of the box 17 affords an outlet for the liquid. The cake from the box 17 is subjected to the action of the shredder 19 and the shredded material carried off as by the belt 20.

The shredded material constitutes a very superior food for cattle and other animals and for chickens with the addition, if desired, of salt, sugar or other suitable materials usually employed in the manufacture of such foods. The cooking process in the vessel 10 and the shredding of the cake destroys the character of the thorns. Analysis shows that the food obtained as described is very materially richer in protein and fat than even wheat, oats, or rye. The liquid extract obtained may be employed as a beverage alone or for the manufacture of a variety of beverages, the tonic value of the extract as obtained from the South American maté being well recognized. In order to prevent the extract from molding or otherwise deteriorating I subject the same to a fermentation process without any loss or any material loss of its values for which purpose the fermentation tank 11 is closed except for a vent pipe 67 in the form of a gooseneck. The lower end of the pipe 67 is submerged in water in a trap 68 and thereby only the gases arising from fermentation escape. The fermented liquor is delivered to the clarifier 12 as follows: The valves 50, 54, 57 are closed as well as the valve 70 in a pipe 71 extending from the pump inlet 60 to the tank 16, which pipe 71 is for the purpose of pumping the liquid from the tank 16 as hereinafter explained. With the pump now started the liquid will be drawn from the bottom of the fermentation tank 11 to the lower end of pipe 56, through pipe 58 to the pump inlet 61 and will be discharged to pipe 62 to the filter and clarifier 12. Said clarifier 12 has baffles 72 rising from the bottom thereof and alternating with baffles 73 depending from the top of the clarifier, so that with the flowing of the liquid from inlet pipe 62 to the outlet pipe 63, at the opposite end, the scum will be prevented from being carried along with the liquid and will be afforded opportunity to rise to the surface.

The scum in practice is taken off by means of a cylinder 74 on which the scum settles, said cylinder turning in close contact with an edge 75 of a trough 76 leading outward at a side of the clarifier 12 for conducting away the scum scraped off the cylinder 74. A second cylinder 74 and trough 76 are provided at the far end of the clarifier from the inlet pipe 62. The cylinders 74 may be driven in any suitable manner there being indicated pulleys 77 thereon to receive a belt (not shown) from any convenient power.

The clarifier 12 has a large capacity in practice or a plurality of such clarifiers are employed. When the clarifier or clarifiers have been filled, a pumping circuit is established from the pipe 63 through valve 64 to inlet 60 through the pump 14, and pipe 53 to the vessel 10. The vessel 10 is now employed as a concentrator by establishing through pipe 65 a connection with the condenser 13. The liquid having been drawn from the clarifier 12 to the vessel 10, all the valves relating to the pumping system are closed, so that the concentrating may proceed with the aid of the condenser 13. The concentrated product which I thus obtain is in practice made up in compressed tablet form as a confection, or as a medicine having laxative properties.

I would here mention that while the leaves are being treated in the vessel 10 they are advantageously agitated by a suitable number of revolving agitating blades 78 driven in any suitable manner. The shafts of said agitators in the illustrated form have belt pulleys 79.

When liquid is pumped from tank 16 through pipe 71 it may be discharged by any suitable connection not shown leading from bracket 80 of fitting 52 to any desired point of delivery.

The numeral 111 indicates an outlet at the bottom of tank 11 for the outflow of the fermented material. The numeral 81 indicates a platform for convenience in charging the vessel 10.

The invention is applicable to the plants known as Ilex Paraguariensis, commonly known as Yerba Mate, and Ilex Vomitoria, called Cassine or Yaupon, and several species called Ilex Curitibensis, I. Gigantea, I. Ovalifolia, I. Humboldtiana and I. Nigropunctata and Ilex Caa Guazu, which is sometimes known as holly and also Ilex of a large leaf called Guayusa and other similar leaf products.

The described process also effects the pasteurization of the liquid obtained and when properly bottled never molds, sours nor deteriorates, such infusions, generally, when obtained by previous methods, molding or souring within a week. The liquid is available for use to mix drinks such as high balls, cocktails, juleps, punches, etc. the same as heretofore made from alcoholic drinks, although my liquid obtained as described is non-alcoholic and contains no properties to give undesirable after effects. When ilex vomitoria is treated with my process the latter removes the general emetic properties indicated by the name. Furthermore, the tablets or liquor obtained from my process contains vitamines. If the leaves after the extract has been obtained therefrom are pressed and subjected to a bath of soda in the percolator 10 a fatty extract is given off which can be used as a liquid soap. If subjected to percolation with potash, a soft soap or emulsion results which has merit for a hair tonic and for treating the skin. After the removal of the soda or potash and the leaves shredded, they may be useful for filling of cigars and cigarettes. The results of an analysis of extracted and dried mate leaves are as follows:

| | Per cent. |
|---|---|
| Moisture | 3.60 |
| Protein | 12.50 |
| Fat | 11.20 |
| Crude fiber | 27.00 |
| Carbohydrates | 41.85 |
| Ash | 3.85 |
| | 100.00 |

When the liquid is being subjected to the treatment in clarifying or filtering vessel 12 magnesia, borax and similar cleansing products may be employed. The returning of the liquid to the vessel 10 has the effect of pasteurizing the concentrated products.

Having thus described my invention, I claim:

1. In an apparatus of the class described, a vessel adapted to receive the material to be treated, and having a discharge outlet at the bottom, a tubular strainer axially disposed in said vessel, a rod axially positioned in said strainer, and means to tighten the rod for holding the strainer in position.

2. In an apparatus of the class described, a vessel adapted to receive the material to be treated, and having a discharge outlet at the bottom, a tubular strainer axially disposed in said reservoir, a rod positioned axially in said strainer, and means to tighten the rod for holding the strainer in position, said means including a spring yieldable to the expansion of the rod to permit movement of its lower end relatively to the strainer.

STEPHEN M. HOYE.